United States Patent
Gebert

[11] 3,865,167
[45] Feb. 11, 1975

[54] PNEUMATIC TIRES
[75] Inventor: Karl Gebert, Klein-Auheim, Germany
[73] Assignee: Dunlap Ltd., London, England
[22] Filed: May 3, 1973
[21] Appl. No.: 356,940

[30] Foreign Application Priority Data
May 3, 1972 Germany............................ 2221699

[52] U.S. Cl................................. 152/212, 152/168
[51] Int. Cl. ............................................ B60c 11/16
[58] Field of Search ........................... 152/210–212, 152/168, 169, 222

[56] References Cited
UNITED STATES PATENTS

| 1,176,161 | 3/1916 | Nirdlinger | 152/168 |
| 1,864,939 | 6/1932 | Respess | 152/212 |
| 1,948,311 | 2/1934 | Orr | 152/212 |
| 2,746,507 | 5/1956 | Morgan | 152/212 |
| 3,084,732 | 4/1963 | Kronstein | 152/212 |

Primary Examiner—Drayton E. Hoffman
Attorney, Agent, or Firm—Stevens, Davis, Miller & Mosher

[57] ABSTRACT

A radial ply tire is provided with a plurality of antiskid elements in the tread portion. Each element comprises a metal wire or bunch of metal wires disposed substantially perpendicularly to the tread surface and protruding radially outwardly thereof. The wire or bunch of wires are sheathed in rubber, the tread rubber being softer than and having a greater elasticity than the sheathing rubber.

21 Claims, 10 Drawing Figures

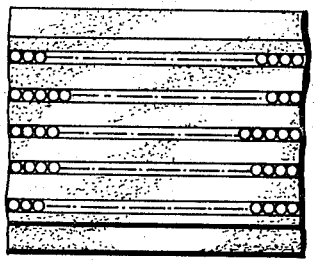
FIG. 3
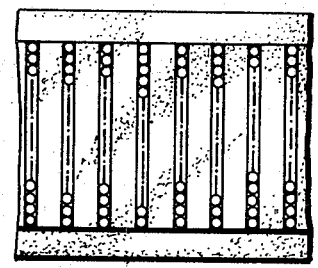
FIG. 4
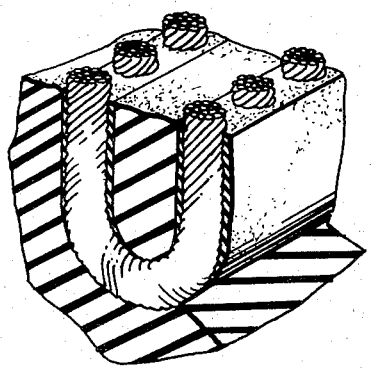
FIG. 5
FIG. 6  FIG. 7  FIG. 8
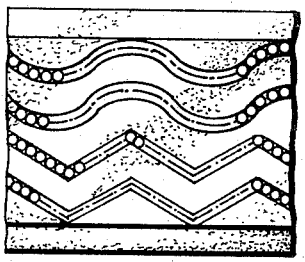 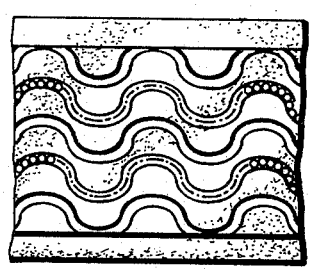 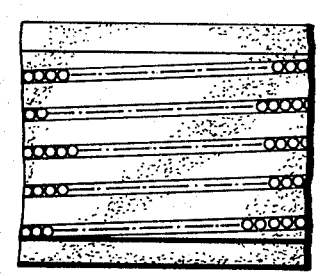
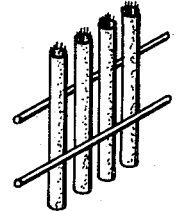
FIG. 9
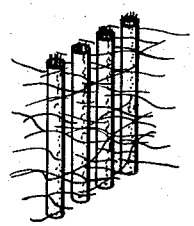
FIG. 10

PNEUMATIC TIRES

The invention relates to pneumatic tires, particularly radial ply tires, having metal elements which are distributed over and are embedded in the tread thereof and project radially outwardly of the tire surface.

Pneumatic tires of this kind are known and are used generally as winter tires. These tires do indeed make possible an improvement in the ground adhesion on icy roads and thus contribute to the increase in traffic safety, but they have the substantial disadvantage that they cause road damage which is still disturbing even upon limitation of the permissible driving speed. By virtue of this resulting road damage, tires of this kind also cannot be allowed as all-the-year-round tires.

It is an object of the invention to provide a road-conserving pneumatic tire which nevertheless possesses a comparatively high coefficient of friction even on ice and which can even be used as an all-the-year-round tire and which is comparable, with regard to tread running qualities, to conventional tires without metal elements embedded into the tread.

In accordance with the invention, a pneumatic tire comprises at least one carcass ply of radially disposed cords, a breaker layer, two bead cores, two sidewall portions and a tread portion, a plurality of anti-skid elements being embedded in the tread portion, the anti-skid elements each comprise a metal wire or bunch of metal wires disposed substantially perpendicularly to the surface of the tread portion, the wire or bunch of wires being sheathed in rubber and protruding radially outwardly of the tread surface, the rubber of the tread portion being softer than and having a greater elasticity than the sheathing rubber.

On slippery, smooth and more especially icy roadways, the plurality of radially directed wires or bunches of wire, which can at all times project only slightly over the tire surface, produces a scratching effect over a large area, which takes effect with regard to security against skidding. Since, through the use of a plurality of aligned wires or bunches of wires, simultaneously the impact effect, present in the case of the usual spike tires, of individual spikes on the road surface is avoided and, instead of the conventional hard metal pins which are in themselves rigid, single scratching elements possessing a certain elasticity in the radial direction and adapting automatically to the degree of wear of the tire are used, no road damage of any kind any longer occurs, so that the tire in accordance with the invention can also be used as an all-the-year-round tire. This is more especially so because the wires or bunches of wires, which project scarcely noticeably over the tire tread, do not lead to any disturbing noise during travel. Furthermore, it is of substantial importance that the resistance to rolling of a tire in accordance with the invention is substantially less compared with the tires previously described as spike tires, which in turn leads to a correspondingly smaller fuel consumption.

The wires or bunches of wires preferably comprise steel wires.

The bunch of wires may be twisted together to form at least one strand. Additionally, two or more strands so formed may be twisted together to produce a cord.

By this means, in each bunch of wires on the one hand an axial elasticity is obtained and, on the other hand, a desirable fanning-out effect is achieved at the free end of the strand or cord arrangement, in which connection the individually projecting ends of the wires are then worn down, by the abrasion occurring in use, in the required manner and at the same time bring about the desired scratching effect.

Preferably, the sheathing rubber of the wires or each bunch of wires is a steel-adhering rubber mixture, the mixture permeating the bunches of wires at least partially. In this manner, a compact combination, always still sufficiently elastic in itself, of bunches of wires is obtained which can be connected in turn to the rubber of the tread portion is a satisfactory and curable manner.

Preferably, the axial length of each wire or bunch of wires is substantially equal to or slightly less than the profile depth. Thus it is ensured that the anti-skid elements, which are formed by the wires or bunches of wires, are effective during substantially the entire duration of life of the tire, namely uniformly effective.

The use of the rubber mixture for the tread portion different from the sheathing mixture makes it possible to use, irrespective of the relatively hard rubber mixture which is necessary for bonding the anti-skid elements, the optimum rubber mixture for the use for which the tire is designed. A rubber mixture which is suitable for snow and ice can, by way of example, be used for the tread, since also such a mixture combines satisfactorily with the sheathing mixture and thereby bonds the anti-skid elements securely in the tread portion.

Preferably, the radially inner ends of the anti-skid elements stand on a base-rubber buffer layer. Such a buffer layer is arranged between the rubber of the tread portion and the breaker layer.

Preferably, the steel wires of the anti-skid elements are made of spring-hard steel, the diameter of individual wires being in the region of approximately 0.1 to 0.4 mm.

The individual anti-skid elements are preferably arranged respectively in a line transversely or circumferentially of the tire and the steel-adhering rubber sheaths are joined to form a web, i.e., effectively forming a fabric web.

This takes effect advantageously more especially upon the production of the pneumatic tire, since steel wire webs are generally available in the tire construction and thus the component parts which are necessary for the construction of the tire in accordance with the invention can be obtained in a simple manner by the use of strips of these steel wire webs. These strips of steel wire webs can then be mounted in a suitable manner standing upright on the tread base.

It is particularly advantageous to use folded strips, namely in such a way that the folded end is arranged on the tread base. In this way, the possibly present danger of the penetration of the elements into the buffer layer, of which is arranged below the tread rubber, is practically completely eliminated.

Furthermore, it is advantageous to coat the steel wire webs, which represent the original material for the previously mentioned strips, or the strips themselves on one or both sides with cord, fabric thread, fleeces or similar fabrics. Upon the use of such kinds of cords or fabrics, the direction of travel of the tread is at an angle of 45 to 90° with regard to the direction of the elements. In the case of cord, the angle amounts preferably to 90°. The threads or fibers, which extend transversely to the direction of the elements of relatively short length, result in a substantial stabilization of the arrangement, and thus the strips can also absorb tensile stresses which unavoidably occur upon the manipulation of the strips and more especially upon the preparation of the tire. Thus, the danger is also eliminated that undesirably different spacings of the individual elements are obtained virtue of elongations of the strips.

Further advantageous features of the invention consist in that a plurality of mutually spaced rows of elements extend around the tire circumference, in which connection these rows may extend straight, in wave-shaped, zig-zag-shaped or meander-shaped manner, or transversely or diagonally. In this way, an optimally large and effective scratching surface is obtained, which comes into play particularly upon the braking of a vehicle on which the tire is mounted, since, in this connection, a compression of the rubber occurs which is greater than the radial compression of the elements, which can thus project somewhat more radially outwardly from the tread surface.

Preferably, the configuration of the rows which extend around the tire circumference is adapted to the configuration of the profile. However, it is not absolutely necessary to have regard for the later profiling upon the arrangement of the rows, which extend around the tire circumference, of the elements. An arrangement is also possible which does not extend over the entire width of the tread, but only provides arrangements of steel wire pieces or steel wire bunches in specific strip-shaped regions of the tire tread.

The invention is further described hereinunder, by way of example only, with reference to the accompanying drawings, of which:

FIG. 3 is a plan view of the anti-skid elements in circumferentially extending grooves;

FIG. 4 is a plan view of the anti-skid elements in axially extending grooves;

FIG. 5 is a perspective view, partly in section, of a U-shaped fabric web forming two lines of elements;

FIGS. 6–8 are plan views similar to FIGS. 3 and 4 showing alternative arrangements of the anti-skid elements;

FIGS. 9 and 10 are perspective views of the fabric web interconnected by cords or fleece.

Figure 1:
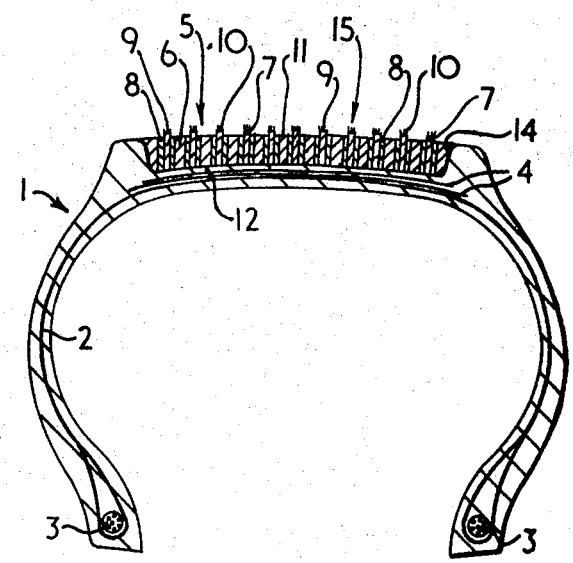
FIG. 1 shows a diagrammatic cross-sectional view of a pneumatic tire in accordance with the invention prior to the moulding of the tread profile therein.

FIG. 1 shows diagrammatically a radial ply tire 1 having a single carcass ply 2, the cords of which are disposed radially of the tire, bead wires 3, a breaker layer having two layers 4 and a tread portion 5.

Arranged in a recess 14 which extends around the entire tire circumference, or several correspondingly narrower recesses in the tread portion, are several rows 15, which are spaced transversely of the tire one from another and which likewise extend around the tire circumference, of anti-skid elements 7 of steel wire pieces. The substantially radially directed bunches of wires are twisted into at least one strand 9 and are embedded into a relatively hard, steel-adhering rubber sheath 8.

These stranded steel wire bunches, which are arranged in the circumferential direction at substantially respectively equal mutual spacing, can be obtained in a particularly simple manner in that suitably wide strips are cut off from existing steel cord webs transversely to the axial direction of the cord and then are inserted in a suitable manner into the recess 14 either as strips or as a whole prepared piece.

The axial length of the elements 7 is dimensioned in such a way that the ends 10 of the steel wires project only slightly over the tire surface 11. Thus only very slight projection of the ends of the steel wires is maintained even during the entire duration of life of the tire, since these ends are worn down in accordance with the wear and tear on the tread. It is also possible and, for practical reasons, perhaps advantageous to manufacture the tire in such a way that the elements which are arranged in the tread are not visible before the tire is put into service, i.e., that a thin layer of rubber covers over the ends of these elements. Upon the practical use of the tire, this rubber layer will naturally disappear immediately by abrasion, whereby the elements then protrude in the manner described in the aforegoing.

Furthermore, it is possible to buff the tire in the tread region after manufacture, in order to allow the elements to become visible.

The rubber 6 of the tread 5 can be selected in accordance with the respective requirements. Preferably used for this is a rubber mixture which is suitable for snow and ice and which enters into a strong and lasting union with the relatively hard sheathing rubber. The choice of a relatively soft and elastic rubber mixture for the rubber 6 also has the advantage that, upon the braking, a compression of the rubber occurs, which allows the elements, which are indeed elastic, but less severely compressible, in the radial direction, to protrude further radially outwardly of the tire surface, whereby they become especially effective with a view to the desired scratching effect.

The rows 15, which stretch around the circumference of the tire, of steel wire bunches can be arranged in a straight line, in wave-shaped, zig-zag-shaped, or meander-shaped manner. In this connection it is essential that the greatest possible scratching surface is obtained by the edges, which protrude over the tire surface 11, of the steel wire bunches.

Preferably used for the steel wire is spring steel, the individual wires having a diameter in the range 0.1 to 0.4 mm., both in the case of single wires and in the case of bunches of wires. In this connection, the values $\sigma$ breaking extension (i.e., the extension at breakage) amount by way of example to approximately 1 percent and $\sigma$ breakage (i.e., the stress at breakage) to approximately 220 to 270 kg/mm$^2$.

Figure 2:
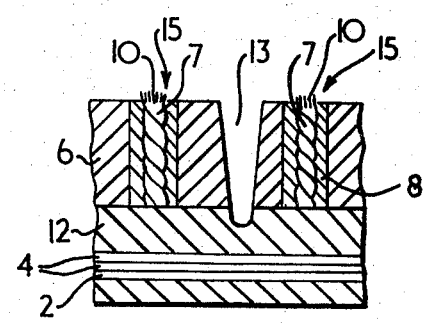
FIG. 2 shows a diagrammatic part-sectional view of a tread region of a tire.

The sectional representation of a region of a tire tread in accordance with FIG. 2 shows that a base-rubber buffer layer 12 is provided between the layers 4 and the tread rubber 6. This layer 12 serves, on the one hand, for the support of the elements and, on the other hand, prevents an undesirable contact from occurring between the layers 4 and the elements.

Furthermore, FIG. 2 shows that the elements, which are distributed over the entire tread of the tire, can be arranged in such a way that profile recesses like 13 lie between the rows of steel wire bunches. Since, however, the steel wire bunches would also yield upon the profiling, it is not a necessary condition to adapt the arrangement of the rows of steel wires to the course of the profile.

Preferably, the elements, i.e., the wire plus the sheathing rubber, occupy 5 percent to 15 percent of the area of the tread portion, the area of the tread portion being considered as the area of a tread portion without any tread pattern therein.

As previously mentioned it is advantageous to coat the steel wire webs on one or both sides with cord, or fabric thread as illustrated in FIG. 9 or fleece as illustrated in FIG. 10. FIG. 5 illustrates the use of folded strips as previously discussed.

Having now described my invention, what I claim is:

1. A pneumatic tire comprising at least one carcass ply of radially disposed cords, a breaker layer, two bead cores, two sidewall portions and a tread portion, a plurality of anti-skid elements being embedded in the tread portion, the anti-skid elements each comprising at least one metal wire disposed substantially perpendicularly to the surface of the tread portion, and protruding radially outwardly of the tread surface, said at least one wire being sheathed in rubber, the rubber of the tread portion being softer than and having a greater elasticity than the sheathing rubber.

2. A tire according to claim 1 wherein the metal wires comprise steel wires.

3. A tire according to claim 2 wherein the steel wires are made of spring steel.

4. A tire according to claim 1 wherein the diameter of individual wires is in the range 0.1 to 0.4 mm.

5. A tire according to claim 1 wherein the rubber sheathing the elements comprises a rubber which forms a good bond with steel.

6. A tire according to claim 1 wherein the axial length of each element is no greater than the depth of a pattern formed in the tread portion.

7. A tire according to claim 1 wherein a rubber buffer layer is provided between the rubber of the tread portion and the breaker layer and on which the radially inner ends of the elements are located.

8. A tire according to claim 1 wherein the elements are located on a line selected from one of the follow directions of the tire; transversely or circumferentially: the sheaths of each element being joined whereby the elements are in the form of a fabric web.

9. A tire according to claim 8 wherein the elements comprise rubberized steel wire fabric web.

10. A tire according to claim 8 wherein the fabric web is formed in a U-shape thereby forming two lines of elements.

11. A tire according to claim 8 wherein the fabric web is adhesively connected, on at least one side thereof by cords, fabric threads or fleece.

12. A tire according to claim 11 wherein the cords, fabric threads or fleece are arranged at an angle in the range 45° to 90° in the direction of the elements.

13. A tire according to claim 12 wherein the cords form an angle of 90° with the elements.

14. A tire according to claim 1 wherein the elements are arranged in at least one row extending around the circumference of the tread portion.

15. A tire according to claim 14 wherein at least two rows of elements are arranged at equal spacings one from another.

16. A tire according to claim 14 wherein at least one row of elements is formed in one of the following configurations; substantially straight, sinuous, zig-zag, meander-shaped, or diagonally.

17. A tire according to claim 14 wherein the configuration of at least one row of elements is adapted to the configuration of a pattern formed in the tread portion.

18. A tire according to claim 1 wherein the elements occupy 5 percent to 15 percent of the area of the tread portion, the area of the tread portion being considered as the area of a tread portion without any tread pattern therein.

19. A tire according to claim 1 wherein each of said elements comprises a plurality of wires in a bunch.

20. A tire according to claim 19 wherein the bunch of wires is twisted to form at least one strand.

21. A tire according to claim 20 wherein at least two strands are twisted together to form a cord.

* * * * *

UNITED STATES PATENT OFFICE
CERTIFICATE OF CORRECTION

PATENT NO. : 3,865,167
DATED : February 11, 1975
INVENTOR(S) : Karl GEBERT

It is certified that error appears in the above-identified patent and that said Letters Patent are hereby corrected as shown below:

Correct spelling of Assignee on first page from "Dunlap Ltd." to --Dunlop Ltd.--.

Signed and sealed this 27th day of May 1975.

(SEAL)
Attest:

RUTH C. MASON
Attesting Officer

C. MARSHALL DANN
Commissioner of Patents
and Trademarks